(12) United States Patent
Busalacchi et al.

(10) Patent No.: US 7,783,766 B2
(45) Date of Patent: Aug. 24, 2010

(54) NETWORK CLUSTERING TECHNOLOGY

(76) Inventors: Frank Busalacchi, 130 Ross Rd., Aptos, CA (US) 95003; David Tinsley, 1228 Greenbriar Ave., San Jose, CA (US) 95128; Wesley Skinner, 10925 N. Aster Ave., Tampa, FL (US) 33612-5913

( * ) Notice: Subject to any disclaimer, the term of this patent is extended or adjusted under 35 U.S.C. 154(b) by 232 days.

(21) Appl. No.: 11/461,401

(22) Filed: Jul. 31, 2006

(65) Prior Publication Data
US 2008/0005298 A1    Jan. 3, 2008

Related U.S. Application Data

(63) Continuation-in-part of application No. 11/428,202, filed on Jun. 30, 2006.

(51) Int. Cl.
*G06F 15/16* (2006.01)
(52) U.S. Cl. ...................................... 709/229
(58) Field of Classification Search ......... 709/223–224, 709/246, 229
See application file for complete search history.

(56) References Cited

U.S. PATENT DOCUMENTS

| | | | |
|---|---|---|---|
| 5,291,583 A | 3/1994 | Bapat | |
| 5,295,256 A | 3/1994 | Bapat | |
| 6,018,760 A | 1/2000 | Oishi et al. | |
| 6,112,210 A | 8/2000 | Nori et al. | |
| 6,370,684 B1 | 4/2002 | De Pauw et al. | |
| 6,434,568 B1 | 8/2002 | Bowman-Amuah | |
| 6,529,909 B1 | 3/2003 | Bowman-Amuah | |
| 6,539,396 B1 | 3/2003 | Bowman-Amuah | |
| 6,615,253 B1 | 9/2003 | Bowman-Amuah | |
| 6,654,796 B1 * | 11/2003 | Slater et al. | 709/220 |
| 6,744,729 B2 | 6/2004 | Tinsley et al. | |
| 7,100,153 B1 | 8/2006 | Ringseth et al. | |
| 2005/0091223 A1 | 4/2005 | Shaw et al. | |
| 2006/0004856 A1 | 1/2006 | Shen et al. | |
| 2006/0224741 A1 * | 10/2006 | Jackson | 709/226 |
| 2007/0058631 A1 * | 3/2007 | Mortier et al. | 370/392 |

OTHER PUBLICATIONS

Xslent Technologies Home (reprinted from http://www.xslent.net/Home/tabid/53/Default.aspx on Dec. 20, 2006).
International Search Report mailed Oct. 10, 2008 for International Application No. PCT/US07/15429.
Notice of Allowance for U.S. Appl. No. 11/428,202 mailed Aug. 26, 2009.
Non-Final Office Action mailed Sep. 15, 2008 for U.S. Appl. No. 11/428,202.

* cited by examiner

*Primary Examiner*—Vivek Srivastava
*Assistant Examiner*—Minh-Chau Nguyen (57) ABSTRACT

Network Clustering Technology ("NCT") creates an controlled environment that allows organizations to manage their networks, information resources, users and uses through a common structure. Although that capability is valuable in and of itself, it has the additional advantage of being both highly configurable and extensible. NCT is implemented so that it can function as a multiple-redundant implementation configuration to ensure that the network experiences minimal downtime with optimized throughput through one or more connections. As part of a Global Information Architecture ("GIA"), NCT provides the capability to establish rules for prioritizing and optimizing network traffic for specific users or classes of users, and specific classes of information traffic.

10 Claims, 8 Drawing Sheets

NETWORK CLUSTERING TECHNOLOGY

CROSS-REFERENCE TO RELATED APPLICATION

The present invention is a continuation-in-part of U.S. patent application Ser. No. 11/428,202, entitled "Global Information Architecture," filed Jun. 30, 2006, the disclosure of which is incorporated by reference herein in its entirety.

BACKGROUND OF THE INVENTION

1. Field of Invention

The present invention relates to information technology and particularly to a technique for aggregating, organizing, and optimizing an organization's networks in order to provide a multi-layered, multiply-administered, universal network management environment using a Global Information Architecture ("GIA").

2. Description of Related Art

Multiple waves of computing have changed the way that organizations do business. No longer are computers a way of handling just bookkeeping or inventory control; now, virtually every function an organization performs has a related object stored on a networked system of computers, many of which take part in automated procedures.

The explosion in automation has resulted in organizations deploying multiple networks in multiple locations to support the systems they have deployed. As automation has expanded, so have network technologies, increasing the need for a universal tool, which speaks a universal language. Today, there are vendors of networking equipment working within the seven-layer Open Systems Interconnection (OSI) model utilizing multiple physical links, often over several media types. There are protocols at virtually every layer that require configuration and management.

Not only does network management today involve managing multiple networks of different types within any given facility, but today's cooperatively wired world requires that these networks interoperate with other locations within the same organization, and even amongst different organizations. In many cases an organization's challenge of managing its networks is as great as, or even greater than, the challenge of supporting its applications. Moreover, in the presence of increasing demands of security and the proliferation of threats, this challenge is becoming ever more complex. Further complications arise when new generations of network management appliances are added to existing network infrastructure.

Traditionally, network management appliances such as routers have been specialized machines with proprietary hardware components that support network operations. However, as microprocessors have become faster, network management software running on general purpose hardware has become an increasingly practical alternative for managing network traffic. Now, all but the highest-throughput network routing applications can be managed using software-based network appliances.

Many of these network management software applications are open-source or very low cost applications. In fact, the major new competitors to the current proprietary network management appliance vendors are not other proprietary network management appliance vendors, but rather are providers of cheap—or free—software that runs on inexpensive, general purpose machines.

Although saving money is often a very useful goal, given the complexity of managing an organization's networks, for large organizations there is a far more important goal to be achieved than finding a low-cost alternative to existing proprietary network appliance vendors: providing a simpler and more effective way of collectively managing their networks. However, no commercial solution has been able to achieve this goal. Although there have been big improvements in looking at information collectively, e.g., portal software and data mining software, and in improving network throughput, no work has been done in relating the problems of managing disparate information sources on different networks with the problem of managing those networks themselves.

Ideally, an organization would have a network management application that understands the organization's goals for using its networks and the structure of the networks it is using, and is able to translate organizational goals into parameters to be used by network appliances to make networks perform properly in support of those goals. This application would also be "globally-deployed" (i.e., deployed on all of the organization's networks). In practice, the information management/network management divide described above has prevented that from happening. Moreover, not only have customers not envisioned such a possibility, proprietary network appliance vendors, which see themselves primarily as packet movers and not collective data managers, are not in a position to bridge the divide.

SUMMARY OF THE INVENTION

The present invention overcomes these and other deficiencies of the prior art by providing Network Clustering Technology ("NCT"), which effectively bridges the gap between managing information and managing networks by creating a common controlled environment for managing information users and the networks they are designed to create and utilize. NCT takes advantage of the modeling capabilities of a Global Information Architecture ("GIA") to implement a universal, multiply-administered, configured, executable network management model that provides for the effective management of multiple, distinct, distributed networks, and the optimization of the traffic that flows through them.

The implemented NCT model allows organizations to define network and subnet configurations, control network appliances and networked computers, and manage secure communications over the Internet. It provides for secure, prioritized, encrypted communications that can make use of industry standard approaches to ensuring data integrity, both within controlled networks and in the public Internet. NCT also collects "Intelligent Fabric" measurements, and can provide information to its predictive analysis models to support Quality of Service ("QoS") levels. NCT can function in a multiple-redundant configuration to ensure that the network experiences minimal downtime with optimized throughput through one or more provider connections. Finally, as part of GIA, it provides the capability to establish rules for prioritizing and optimizing network traffic for specific users or classes of users, and specific classes of information traffic.

The invention provides a method for managing a network administrative control system in a controlled environment, the method comprising the steps of: creating an information object comprising an access rule and a relationship, wherein the access rule is for the system and is defined by a relationship of the system; determining a privilege of the system based on the access rule; and managing the system by enforcing the privilege. The method can further comprise repeating the creating, determining, and managing steps for another system that is part of the environment.

The invention also provides a method for executing an application in a controlled environment, the method comprising the steps of: defining a parameter structure, wherein the parameter structure comprises a parameter for an application and a first information object; defining a parameter configuration, wherein the parameter configuration comprises a parameter for a controlled environment and a second information object; defining a command structure, wherein the command structure comprises a template with the parameter, and executing the command structure in said application. The parameter structure can comprise a parameter specifying a location of an executable to run the application. Executing the command structure can comprise the steps of: identifying a device for managing flow of information in or out of a network; and transmitting a behavior definition to the device, wherein the behavior definition is created using the parameter for a controlled environment. The parameter for a controlled environment can be an IP address or domain name, a firewall command, be associated with load balancing, or define bandwidth. The device can configure the network according to the behavior definition. Configuring the network can comprise translating the network behavior definition into a configuration request for a system manager in communication with a network-support device; and transmitting the configuration request to the system manager. The system manager can translate the configuration request into a command for the network-support device and transmit the command to the network-support device. The network-support device can configure itself according to the command.

The invention also provides a network control system comprising: a node manager, one or more network appliances, and at least one appliance manager for each of the one or more network appliances, wherein the node manager keeps track of one or more roles each of the one or more network appliances is responsible for fulfilling. The node manager can receive a network behavior definition and send a configuration request to at least one of the appliance managers.

The invention also provides a method for managing a network in a controlled environment, the method comprising the steps of: receiving a network behavior definition from a network control system; translating the network behavior definition into a configuration request for a system manager in communication with a network-support device; and transmitting the configuration request to said system manager. The network behavior definition can be received at a secure location. The configuration request can be transmitted using a secure transmission scheme. Receiving a network behavior definition can comprise the steps of: polling a specified location for an updated network behavior definition; and receiving from the specified location an updated network behavior definition. The specified location can have no access to the system receiving the network behavior definition. The method can further comprise evaluating the flow of traffic in the network. The method can further comprise the steps of: storing a network behavior definition; translating the stored network behavior definition into a second configuration request for the system manager if the flow of traffic fails to meet performance criteria; and transmitting the second configuration request to the system manager. The network control system can be notified of a failure of the flow of traffic. The network behavior definition can be stored in a secured location.

The invention also provides a method for controlling a network-support device, the method comprising the steps of: receiving a configuration request from a network control system manager; translating the configuration request into a command for the network-support device; and transmitting the command to the network-support device. The translating step can comprise creating a command utilizing information provided by a third party and the received configuration request. The information can comprise: information regarding a relationship between the network-support device and a second network-support device; information regarding a relationship between a plurality of network components available on the network-support device; or information regarding a relationship between a plurality of services that are provided by a network component on the network-support device. The command can be transmitted using a secure transmission scheme.

The invention further provides a method for creating a network control system, the method comprising the steps of: executing an initial boot configuration on a machine capable of executing network control system manager programs; determining whether there is an alive network control system manager on the network; and configuring the machine based on that determination. The initial boot configuration can be used to configure the machine. The configuring step can comprise: receiving an instruction from an alive network control system manager; and using the instruction to configure the machine. The instruction can be received at a secure location. Receiving the instruction can comprise: polling a location specified by the initial boot configuration for an instruction from the alive network control manager; and receiving from the specified location an instruction from the alive network control system manager.

The invention also provides a method for creating a network control system, the method comprising the steps of: receiving a network behavior definition from a higher network control system; and using the network behavior definition to configure the network control system. The network behavior definition can be received at a secure location. Receiving the network behavior definition can comprise: polling a location specified by the initial boot configuration for a network behavior definition; and receiving from the specified location a network behavior definition.

The invention further provides a method for managing a network administrative control system using a configurable remote interface, the method comprising the steps of: creating a payload comprising a plurality of commands for the system, and transmitting the payload to a specific location capable of being accessed by the system using a configurable remote interface. The remote interface can be configured to operate normally when intermediate commands for the system block subsequent commands for the system. The payload can be transmitted using a secure transmission scheme. The specific location can be secure.

The invention also provides a method of managing Quality of Service between two nodes, the method comprising the steps of: creating a channel by assigning a priority or a permission to a tunnel between the two nodes; identifying a priority or a permission of a data stream; matching the priority or permission of the data stream to the channel; and directing the data stream for transmission through the tunnel.

The invention also provides a method of managing Quality of Service for a user, the method comprising the steps of: associating a user with a priority or permission, tagging data associated with the user with the priority or permission, and matching the tagged data to a channel assigned the priority or permission.

The invention further provides a computer readable medium having computer-executable instructions for performing a method comprising: receiving a network behavior definition from a network control system; translating the network behavior definition into a configuration request for a system manager in communication with a network-support device; and transmitting the configuration request to the system manager.

The invention also provides a computer readable medium having computer-executable instructions for performing a method comprising: receiving a configuration request from a network control system manager; translating the configuration request into a command for a network-support device; and transmitting the command to the network-support device.

The invention further provides a computer readable medium having computer-executable instructions for performing a method comprising: creating a payload comprising a plurality of commands for a network administrative control system, and transmitting the payload to a specific location capable of being accessed by the system using a configurable remote interface.

An advantage of the invention is that a configurable network definition model is provided, which ensures upward compatibility with new technologies with minimal programming. Another advantage of the invention is simplified administration as a single point of administration can control the entire clustered network, including both local and remote networks, or any subset of the cluster ("subclusters"). A further advantage of the invention is that administrative access to network clusters or subclusters is distributed over multiple locations, and is controlled from multiple locations.

An additional advantage of the invention is the ability to define prioritization, optimization, QoS rules based on user, application, role, or any other criteria within the model, and have these criteria be reflected in network behavior. The invention also provides the advantage of optimized communication channels which provide the best possible speed while still allowing communications to be securely transmitted over the public Internet. A further advantage of the invention is the incorporation of a model for multiply-redundant operations which ensures the maximum possible up time. An additional advantage of the invention is simplified cross-organizational interoperability, as the NCT model includes the principle of "organizational neutrality," i.e., it supports multiple organizations, but with organization-specific control capabilities. This principle, expressed through the model, enables cross-organizational interoperability with a minimum of technical—and political—complications.

The foregoing, and other features and advantages of the invention, will be apparent from the following description of the invention, the current embodiments of the invention, the accompanying drawings, and the claims.

DESCRIPTION OF EMBODIMENTS

Further features and advantages of the invention, as well as the structure and operation of various embodiments of the invention, are described in detail below with reference to the accompanying FIGS. 1-10. Though the invention are described in the context of a Global Information Architecture ("GIA"), one of ordinary skill in the art recognizes the invention is applicable to any software environment and to any network application component or network hardware component.

In current information network environments, many discreet network components exist. The integrated management of these components is typically expensive and difficult, due to the lack of a universal structure for network management. Network Clustering Technology ("NCT"), as described herein, applies the concepts of a Global Information Architecture ("GIA"), which are discussed in detail in U.S. patent application Ser. No. 11/428,202, to overcome these problems.

GIA is an information management environment for managing a Global Information Grid ("GIG"). A Global Information Grid refers generally to a distributed environment for collecting, transforming, and presenting information to users, both human and machine. GIA is especially well suited for use in NCT, as GIA manages information objects-objects that do not have algorithmically intense or very specific operations-through collections of configured components. (An object is a software construct within an object-oriented (OO) software execution environment, e.g., Java, which is capable of receiving messages, processing data, and sending messages to other objects. Objects typically have "services" through which they receive messages, which then process data through "methods," i.e., subroutines, with the same name. They can also store values in "attributes." These values include object-specific information and also relationship-enabling information, i.e., information that enables the object to send messages to another object. When these attributes are visible to other objects, they are often referred to as "properties.") These types of objects have the useful characteristics of being both capable of supporting a very large subset of the overall software requirements for highly network-centric information environments, and being able to be implemented as a collection of relatively simple, reusable objects, which is a technique used by GIA.

In traditional object-oriented development, object behavior, e.g., services, methods, attributes, etc., is defined by a "class," where all objects of a particular class have the same behavior. Any changes to behavior are implemented by programming a new class. However, GIA takes a different approach: rather than adapting behavior by creating or changing classes, it uses multi-purpose classes that are designed to implement behavior through collections of configurable, multi-purpose components. GIA's implementation of information objects through these collections of configured components enables complete configurability.

A central concept in GIA is that objects can be referenced in multiple "WorldSpaces" and these are inherently hierarchical. A user's (including non-human users) view of information data sources are controlled by her WorldSpace, a structure that uses the attributes of the user to identify the appearance and behavior that an object in GIA would present to her. These attributes can include, but are in no way limited to, the user's username, roles, language, locale, e-mail address directory, security clearance, and organization. Hence, a WorldSpace allows constraint of objects and its services that are available to a user. This view is itself described via Vector Relational Data Modeling ("VRDM") through vectors and is wholly configurable.

The constructs that define a relationship between information objects comprise constructs that define the relationship itself, constructs that define the characteristics of the relationship, and constructs that define the use of the relationship by the originating information objects. VRDM represents these constructs as information objects. These, in turn, are each information objects in their own right. The iterative process of assembling primitive constructs that are then used to configure larger constructs, and then larger constructs until CIA is completely assembled allows for a very high level of configurability, much higher than using a traditional, programmed approach.

A user's WorldSpace is defined by vectors describing the traversal from the user to the objects of interest. These vectors, which are configurable, then constrain what objects a user can see and/or change. Since WorldSpace constraints are described through VRDM metadata, the description of the WorldSpace can be changed completely, allowing for new and unique implementations of WorldSpaces without coding.

To create NCT, GIA's ubiquitous information management capability is configured to create a universal network management environment. Utilizing GIA as a foundation, NCT implements a universal, multiply-administered, configured, executable network management model that provides for the effective, collective management of multiple, distinct, distributed networks, and the optimization of the traffic that flows through them.

Figure 1:
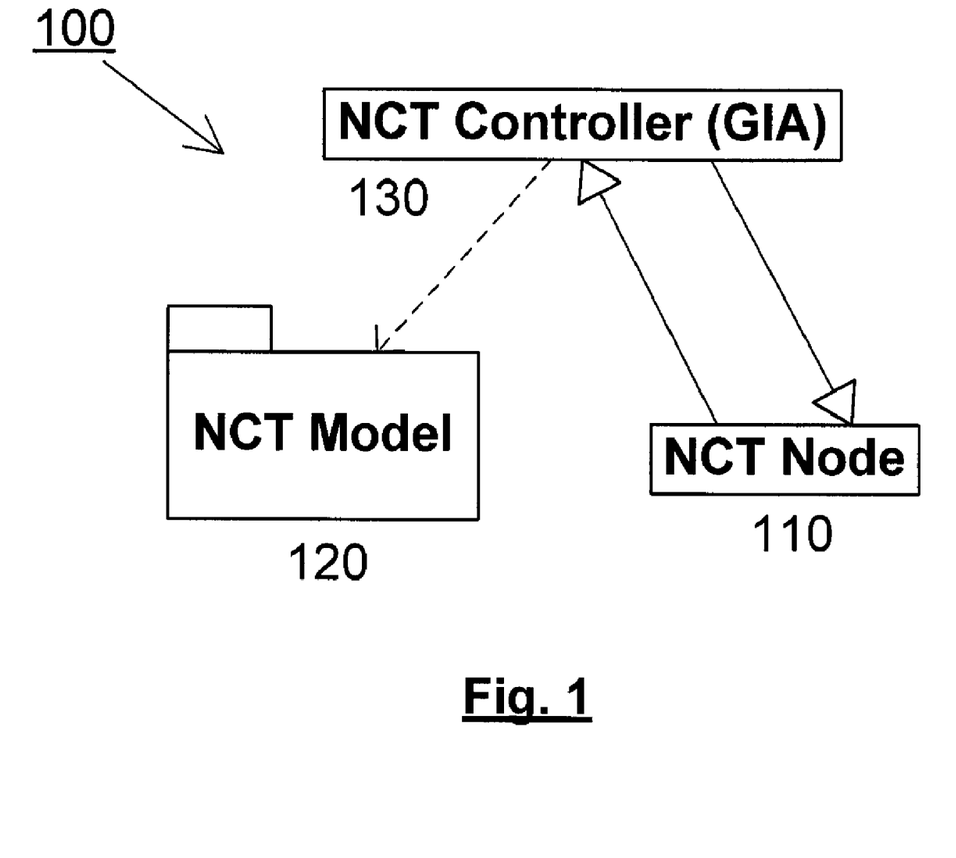
FIG. 1 illustrates a Network Clustering Technology ("NCT") system according to an embodiment of the invention.

FIG. 1 illustrates an NCT system 100 according to an embodiment of the invention. System 100 comprises an NCT Node 110, an NCT Model 120, and an NCT Controller 130, each discussed in more detail in their respective sections below. While only one NCT Node 110, NCT Model 120, and NCT Controller 130 are shown, any number of NCT Nodes 110, NCT Models 120, and NCT Controllers 130, and/or their respective components, can be included in system 100.

NCT Node

Figure 2:
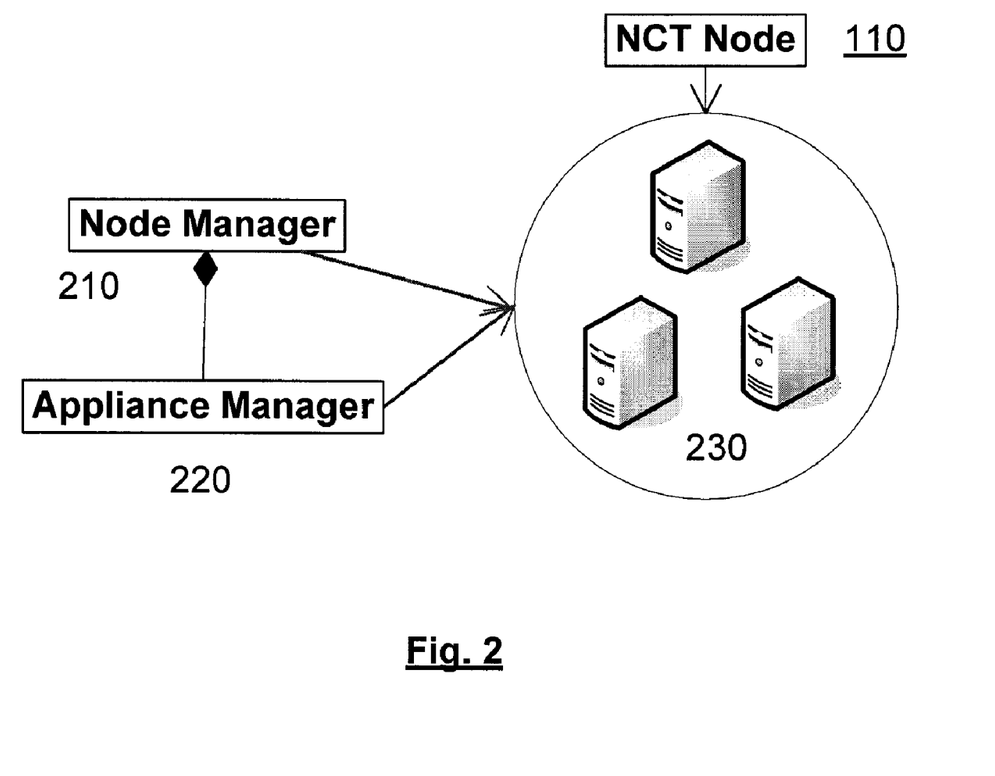
FIG. 2 illustrates an NCT Node according to an embodiment of the invention.

FIG. 2 illustrates an NCT Node 110 according to an embodiment of the invention. An NCT Node 110 is a network administrative control system that manages one or more Network Appliances 230 to control the flow of information in and out of networks, a network, or portion of a network. How the Network Appliances 230 are managed is dictated by users of an NCT controlled environment, and an NCT Node 110 can manage the Network Appliances 230 differently for different users. For example, for a first user, NCT Node 110 can manage Network Appliances 230 to collectively perform the functions of the network application RouteD, while for a second user, NCT Node 110 can manage Network Appliances 230 to collectively perform the functions of an advanced software firewall. A user is understood to be anything that interacts with an NCT controlled environment, such as, but not limited to, a person, another program, or a device. NCT Node 110 comprises a Node Manager 210 and one or more Appliance Managers 220, with each Appliance Manager 220 acting on a Network Appliance 230.

A Node Manager 210 comprises one or more programs and configurations which manage an NCT Node 110. Configurations can be, but are not limited to, GIA compliant information objects, or one or more files. The configurations contain, but are not limited to attributes of the NCT Node 110 and contain parameters which instruct the NCT Node 110 to manage the Network Appliances 230 in a specific way. Node Manager 210 keeps track of which Network Appliances 230 it has in its configuration, what network components each Network Appliance 230 comprises, and what network-support function each Network Appliance 230 is responsible for fulfilling, such as routing, or switching. A network component is a software application or piece of hardware that performs a network-support function. The Node Manager 210 presents a unified interface as the NCT Node 110 to an NCT Controller 130, discussed in more detail below, and receives network behavior definitions from an NCT Controller 130. Based on its understanding of the network-support functions that each Network Appliance 230 is performing, or capable of performing, for the NCT Node 110, Node Manager 210 sends configuration requests to its Network Appliances 230 that require the configuration information through its Appliance Managers 220.

The Node Manager 210 sends configuration requests to Network Appliances 230 by translating the incoming network behavior definitions into a format that is understandable by each Network Appliance's 230 Appliance Manager 220, and transmitting the configuration requests to those Appliance Managers 220. For instance, a network behavior definition could be:

Permitted Incoming IP Address: 101.101.101.101
Permitted applications: Incoming Secure Mail
    http.

The Node Manager 210 would translate this network behavior definition into:

Firewall rules: allow port 995 for 101.101.101.101
    allow port 80 for 101.101.101.101.

The translation performed by the Node Manager 210 depends on the structure of the network behavior definition, and the structure of the Network Application, discussed in detail below. Node Manager 210, by utilizing the functionality of GIA, can do any appropriate translation. In an embodiment of the invention the Node Manager 210 bundles all of the commands into a package based on XML. The package is also Remote Command Line Interface ("RCLI") compliant (RCLI is discussed in more detail below). The package might look something like:

```
<firewall rules>
    <rule> allow port 995 for 101.101.101.101</rule>
    <rule> allow port 80 for 101.101.101.101</rule>
</firewall rules>
```

A single program can fulfill the functions of a Node Manager 210, or a collection of equivalent programs can be used in a load-balancing or failover configuration. In an embodiment of the invention, NCT Node 110 has "Configuration Tolerance." For example, if NCT Node 110 is configured and no traffic is moving over its network, then the Node Manager 210 assumes that its configuration is invalid, reverts to a previous stored configuration, and raises a flag to be handled by its NCT Controller 130.

The Appliance Manager 220 comprises one or more programs and configurations which control one or more Network Appliances 230. Configurations can be, but are not limited to, GIA compliant information objects, or one or more files. The configurations contain, but are not limited to, attributes of the Network Appliances 230 controlled by the Appliance Manager 220. The Appliance Manager 220 translates a configuration request received from the Node Manager 210 into a format that can be loaded by its Network Appliances 230. Translation is facilitated by an NCT Appliance configuration, the creation and distribution of which is discussed in more detail below. The NCT Appliance configuration understands the relationships between Network Appliances 230 of a particular type, the relationships between network components that are available on a particular Network Appliance 230, and the relationships between services that are provided by each network component.

Based on the understandings provided by the NCT Appliance configuration, Appliance Manager 220 uses the configuration request received from Node Manager 210 to create commands for its Network Appliances 230 to operate in a specified manner. The commands can be formatted in any manner desired. Commands in the configuration request are broken down for each type of Network Appliance 230 controlled by the Appliance Manager 220. Continuing the firewall example from above, the NCT Appliance configuration might specify that there is a Network Appliance 230 called "thefirewall" capable of operating as a firewall, which takes firewall rules as command line arguments. The Appliance Manager 220 will translate the package received as part of the configuration request into:

thefirewall allow port 995 for 101.101.101.101
thefirewall allow port 80 for 101.101.101.101

After translating the configuration request, Appliance Manager 220 sends the commands to its Network Appliances 230 as required. A single program can fulfill the functions of Appliance Manager 220, or a collection of equivalent programs can be used in a load-balancing or failover configuration.

Network Appliances 230 are network-support devices which comprise one or more network components. Network Appliances 230 perform at least one network-support function, such as, but not limited to, routing, switching, shaping packets, acting as a firewall, providing DNS, providing DHCP services, and relaying signals. Network Appliances 230 can be general purpose computers running software-based routing programs, or network management machines that have an operating system and environment suitable for running these programs. Network Appliances 230 receive commands from an Appliance Manager 220, and are configured when those commands are executed. Multiple Network Appliances 230 can be utilized in an NCT Node 110. Such a configuration, for example, can provide redundancy, load balancing, and facilitate higher data throughput within, or into and out of, the NCT Node 110.

To illustrate example functionality of an NCT Node 110, if a Node Manager 210 is informed by an NCT Controller 130, by means of network behavior definitions, that the NCT Node 110 should manage a network with a particular range of IP addresses, the Node Manager 210 sends configuration requests to the Appliance Managers 220 that are managing the Network Appliances 230 providing Dynamic Host Configuration Protocol ("DHCP") services. The Appliance Managers 220, utilizing received configuration requests and an NCT Appliance configuration, create and transfer commands to their Network Appliances 230. The Network Appliances 230 receive the commands and become properly configured when the commands are executed. The functions of the Network Appliances 230, collectively, result in an NCT Node 110 that manages the specified range of IP addresses.

An NCT Node 110 operates much like a computer, where Node Manager 210 functions as the operating system for the NCT Node 110, the Network Appliances 230 act as the components of the computer, such as the disk drive or the network card, and the Appliance Managers 220 function as the device drivers for the Network Appliances 230. The functions performed by the NCT Node 110 are dictated by its Network Appliances 230, just as the capabilities of a computer are substantially dictated by the peripherals (and device drivers) that are included in the computer. The separation of Node Manager 210 and Appliance Manager 220 functions allow NCT to "cluster" networks, i.e., manage a set of Network Appliances 230 and their attendant networks as though they were one machine. In an embodiment of the invention, the Node Manager 210 and Appliance Manager 220 are executed on the same machine, e.g., a general purpose computer functioning as a Network Appliance 230.

Node Manager 210 and Appliance Manager 220 are executed on NCT Machines. An NCT Machine is any machine capable of executing Node Manager 210 programs and/or Appliance Manager 220 programs. In an embodiment of the invention, an NCT Machine is a general purpose computer strictly responsible for running the programs of the Node Manager 210 or Appliance Manager 220. In another embodiment, where a Network Appliance 230 is a general purpose computer, an NCT Machine is the same machine as the Network Appliance 230. Appliance Manager 220 can execute on the machine it is controlling, and the functions of Node Manager 210 and Appliance Manager 220 can be performed by a single NCT Machine. The functions of Node Manager 210 and Appliance Manager 220 can also be distributed over several NCT Machines collected in NCT Node 110 to provide, for example, redundancy, load balancing, and enhanced throughput. When multiple NCT Machines perform the functions of Node Manager 210, NCT Node 110 still presents a single uniform interface to NCT Controller 130 when receiving network behavior definitions from NCT Controller 130.

Figure 3:
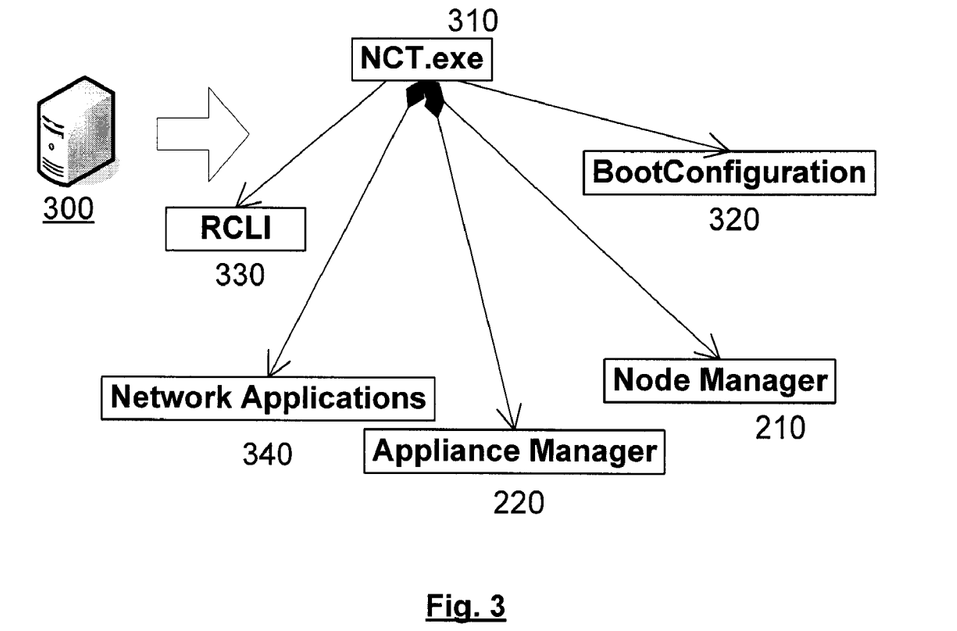
FIG. 3 illustrates an NCT Machine according to an embodiment of the invention.

FIG. 3 illustrates an NCT Machine 300 according to an embodiment of the invention. NCT Machine 300 comprises an executable ("NCT.exe") 310 that is started when NCT Machine 300 is booted, a startup configuration ("BootConfiguration") 320 that tells NCT Machine 300 how to assemble itself, an RCLI 330, discussed in more detail below, and a set of Network Applications 340, e.g., one or more applications that perform some kind of network control such as, but not limited to firewalls, routers, programmable switches, DHCP managers, DNS managers, that are executed to support the network functionality contributed by the present NCT Machine 300 to the NCT Node 110.

In an embodiment of the invention, an NCT Machine 300 undergoes a three step self-assembly process. First, the NCT Machine 300 boots itself using BootConfiguration 320. BootConfiguration 320 can be, but is not limited to, GIA compliant information objects, or one or more files. BootConfiguration 320 contains, but is not limited to, attributes of the NCT Node 110 the NCT Machine 300 will be a part of, and parameters instructing the NCT Machine 300 how to assemble itself.

Second, the NCT Machine 300 checks its BootConfiguration 320 to determine whether there are other NCT Machines 300 in its NCT Node 110. If there are other NCT Machines 300 in its BootConfiguration 320, then the NCT Machine 300 broadcasts a request for other NCT Machines 300 on the local network. In an embodiment of the invention, NCT Machine 300 broadcasts the request using a configurable protocol based on the Simple Service Discovery Protocol ("SSDP") and Service Location Protocol. If there is another NCT Machine 300 that is alive in NCT Node 110, the requesting NCT Machine 300 is notified by the alive NCT Machine 300 that the alive NCT Machine 300 exists. The requesting NCT Machine 300 then goes into polling mode waiting for instructions from the alive NCT Machine 300. The alive NCT Machine 300 updates the requesting NCT Machine 300 by communicating with its RCLI 330 and storing network behavior definitions in a specific location, discussed in more detail below.

Third, if there are no alive NCT Machines 300 in NCT Node 110, the NCT Machine 300 configures itself to be a Node Manager 210 and, if specified in the BootConfiguration 320, an Appliance Manager 220. The NCT Machine 300 then raises a flag in a location specified in its BootConfiguration 320. The Node Manager 210 will periodically look in a location specified by BootConfiguration 320 for updated network behavior definitions from its NCT Controller 130. These network behavior definitions, as discussed above, will give NCT Machine 300, and thus NCT Node 110, its next network management configuration.

In an embodiment of the invention, some or all of the NCT Machine 300 assembly process, and network behavior definition update process, takes place using secure and/or encrypted techniques and protocols. NCT Machine 300 can utilize an encrypted flag to update Node Manager 210, thereby requiring Node Manager 210 to have the proper permissions to receive an updated network behavior definition. Furthermore, the location of the updated behavior definition can be jailed, i.e., operating system-level virtualization, the implementation of which is apparent to one of ordinary skill in the art, can be used to partition the location of the updated behavior definition. This jail can have very low functionality to prevent unauthorized access to the network behavior definitions.

This disconnected flag-and-polling approach to accessing a new network behavior definition permits an NCT Node 110 to be installed without allowing any outsider to have access to the NCT Node 110, and without announcing itself to the outside world. In fact, using a low-functionality jail, as discussed above, the flag storage and network behavior definition upload location can be on the same NCT Machine 300 as the Node Manager 210 without the possibility of anyone gaining unauthorized access to the NCT Machine 300 or any of its software.

Based on BootConfiguration 320 or the configuration supplied by NCT Controller 130, and the state of the other machines in NCT Node 110, the assembly process causes NCT Machine 300 to start up as a Node Manager 210 and, potentially as an Appliance Manager 220, and be in communication with a Node Manager 210 or with one or more Appliance Managers 220.

In an embodiment of the invention, the RCLI 330, introduced above, accepts a payload—a collection of commands and parameters that are passed from one NCT Node 110 to another or from an NCT Controller 130 to an NCT Node 110—transmitted using any standard network communication technique, such as TCP/IP. The payload can be encrypted using Secure Shell ("SSH") protocols or similar secure transmission schemes. The transmitted payload comprises information necessary to activate and configure the NCT Node 110, or just network behavior definitions necessary to change to the NCT Node 110 network management configuration. The RCLI 330 provides the contents of the received payload to the Node Manager 110. If necessary, the RCLI 330 also decrypts the payload. The RCLI 330 operates without user interaction, permitting a non-privileged user to execute certain, limited privileged commands without allowing full (root) access to that privileged user. Such limited commands may be, for example, the ability to add a route to a static routing table. Moreover, RCLI 330 itself is configurable and can accept and execute any collection of commands and parameters, allowing new types of applications to be configured through the payload without modification. As RCLI 330 is executed on an NCT Machine 300 local to NCT Node 110, even changes that temporarily make NCT Node 110 unavailable to its NCT Controller 130 are possible. Hence, RCLI 330 avoids the problems associated with traditional remote procedural calls ("RPCs"). For example, when multiple calls need to be performed, but intermediate calls block subsequent calls, RPC's fail completely, while RCLI 330 operates normally. RPC's also require direct access to system behavior, a major security vulnerability. Finally, unlike RPC's, by altering the RCLI's 330 configuration files and input parameters, RCLI 330 external access can be configured to permit only extremely limited interaction with the NCT Machine 300, such as the ability to create a file or read a file under a secure protocol, thus limiting security vulnerabilities. In en embodiment of the invention, RCLI 330 is implemented using an object oriented programming language, such as, but not limited to C++ or Java.

In an embodiment of the invention, secure "Configuration Tolerance" of NCT Node 110 is possible. Node Manager 210 receives network behavior definitions from NCT Controller 130 via RCLI 330 and stores the network behavior definitions in a secured location. Node Manager 210 then securely transmits configuration requests, without intervention, to Appliance Manager 220 to configure it to support a desired network configuration. If no traffic is moving over the network of NCT Node 110, Node Manager 210 assumes that its network management configuration is invalid, reverts to a previous network management configuration stored in a secure location, and raises a secure flag to be handled by its NCT Controller 130.

In an embodiment of the invention, a Virtual Redundancy Router Protocol ("VRRP"), the implementation of which is apparent to one skilled in the art, runs on all of the NCT Machines 300 in NCT Node 110. The VRRP provides failover capability to the management of the Node Manager 210, the RCLI 330, and to the execution of Network Applications 340 on multiple Network Appliances 230.

Figure 4:
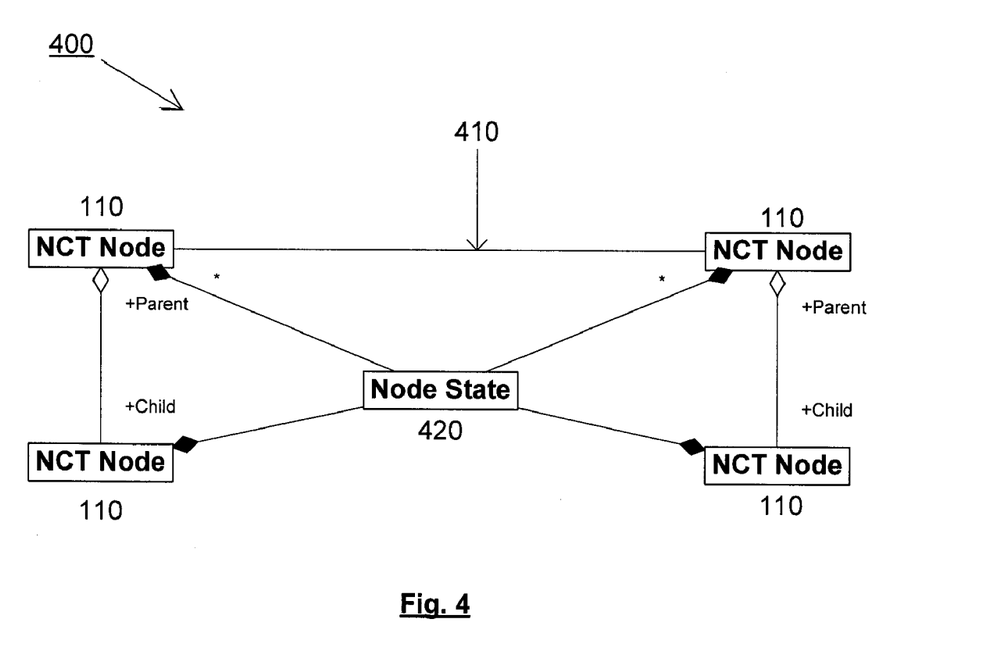
FIG. 4 illustrates NCT relationships between multiple NCT Nodes according to an embodiment of the invention.

Having described the fundamentals of an NCT Node 110, further details regarding how different NCT Nodes 110 within an NCT controlled environment are related or communicate are now discussed. FIG. 4 illustrates NCT relationships 400 between NCT Nodes 110 according to an embodiment of the invention. NCT relationships 400 comprise Parent/Child relationships and NCT Connection 410 relationships, each described in more detail below.

The parent/child relationship between multiple NCT Nodes 110 supports the description of behavior in increasingly granularity. A child NCT Node 110 encapsulates all of the behavior of its parent, but can also have its own additional behavior. For instance, if a parent NCT Node 110 behaved as a router, a child NCT Node 110 would also behave as a router, but could also behave as a packet filter. In an embodiment of the invention, NCT Nodes 110 have Node States 420. Node States 420 comprise general performance measurements of the NCT Node 110, such as CPU usage and bandwidth usage, collected using any measurement tools available for the NCT Machine 300 on which the Node Manager 210 resides. These measuring tools may include, for example, netstat. A parent NCT Node 110 can collect information about its child's Node State 420, and can summarize that information as part of the parent's Node State 420.

The arrangement of parent and child NCT Nodes 110 does not have to be a pure hierarchy: a child NCT Node 110 can have multiple parent NCT Nodes 110 as required to support the child's usage by users with different, and potentially disparate network needs. In an embodiment of the invention, the child NCT Node 110 manages the collected configurations of its parents using a permissive approach to rules and parameters. Specifically, if there is a conflict between the permissions of two parent NCT Nodes 110, as defined by their WorldSpace, then the permissive union of both configurations is used. For example, if one set of traffic is required for users of a first parent NCT Node 110, and a different set of traffic is required for users of a second parent NCT Node 110, then the child NCT Node 110 would allow both sets of traffic. The traffic is separated using Channels, described below. If two sets of users are using a common NCT Node 110, each set receives permissions based on their login permissions, defined by the user's WorldSpace, discussed in more detail below, which are matched against specific Channels. A user's login can be, for example, a Secure Sockets Layer ("SSL") login, or a Virtual Private Network ("VPN") login., both of which the implementation is known to one skilled in the art. In addition, a parent NCT Node 110 can have multiple child NCT Nodes 110. As illustrated, each child's Node State 420 is summarized as a part of its parent's Node State 420.

Figure 5:
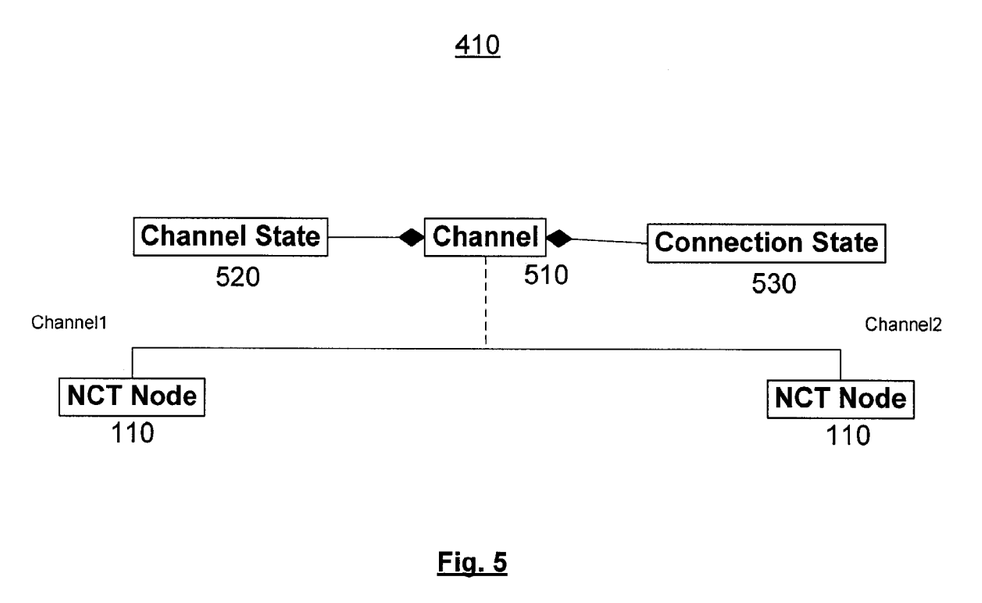
FIG. 5 illustrates an NCT Connection relationship according to an embodiment of the invention.

FIG. 5 illustrates an NCT Connection 410 relationship according to an embodiment of the invention. An NCT Connection 410 is made between NCT Nodes 110, and comprises one or more Channels 510. A Channel 510 comprises a virtual private connection made between NCT Nodes 110. In an embodiment of the invention, the connection is IPSec-enabled, the implementation of which is known to one skilled in the art. Channel State 520 maintains summaries of data relating to a specific Channel 510, and Connection State 530 maintains summaries of data relating to the Channels 510 of NCT Connection 410. NCT Nodes 110 in an NCT Connection 410 relationship can be arbitrarily physically distant, and arbitrarily separated in terms of their network proximity. NCT Connections 410 are created by the Node Manager 210 of an NCT Node 110 to optimize traffic between two NCT Nodes 110 when a user of an NCT Node 110 requires access to a user of, or an information source aggregated by, another NCT Node 110.

If a user wants to take advantage of an NCT Connection 410, for example, to utilize a database connected to a remote NCT Node 110, the user will either do so through the existing Channel 510, if the user has the same priority and permissions as Channel 510, or another Channel (not shown) will be created with different priority and permissions than the original Channel 510 to reflect the corresponding priority and permissions of the user. This permits traffic and channels to be prioritized, with the most important traffic getting the highest priority, and the fastest and most stable Channels 510, and less important traffic and users being assigned to less stable or slower Channels 510. Users and Channels 510 are assigned priorities using any arbitrary GIA-compliant priority schema. GIA-compliant means the schema defines information objects as information objects through a collection of configured components. Traffic characteristics, primarily based on the user generating the traffic, and the type of traffic being generated, are used to associate the traffic of a user with a Channel 510. For example, an arbitrary schema may be defined to assign highest priority, and thus the fastest Channel 510, to traffic generated from university campuses.

After matching a user with a Channel 510, the user's traffic is encoded within the Channel 510 and routed through its corresponding tunnel, which is possibly EPSec-enabled. Channel 510 will remain in place for a period of time determined by the amount and timing of its use, both current and historic, as specified as part of the Channel State 520. Connection State 530 is a summary of the activity associated with its corresponding Channel States 520, and is dynamically updated with traffic amounts, users, priorities, Channels 510, etc.

In an embodiment of the invention, Channel 510 implements conventional routing encapsulation, the implementation of which is apparent to one skilled in the art, to allow multiple tunnels to be created with varying priorities. These tunnels support the Quality of Service ("QoS") guidelines defined for each user and traffic using a GIA-compliant priority schema, discussed above, and in accordance with the QoS metrics of Intelligent Fabric, a method for managing a network fabric for purposes of QoS and prioritization described in U.S. Pat. No. 6,744,729, issued Jun. 1, 2004, and hereby incorporated in its entirety. In addition to priority, tunnels can be generated with different encryption levels, for example, 128 bit or 1024 bit, depending on the sensitivity of the data being transmitted, and recognizing the tradeoff between speed and encryption level. Channels 510 can also be set up to deliver data under minimal or no encryption, or with security headers and/or footers to ensure data integrity. Channels 510 can operate on multiple IPSec tunnels with varying degrees of bandwidth, encryption, and priority, and still remain compliant with IPSec protocols.

The management of QoS between instances of NCT is managed through Channels 510 and NCT Connections 410. Each NCT Node 110 can be evaluated using numerous criteria. These criteria include, but are not limited to, the number of Channels 510 made as a percentage of the maximum number of Channels 510 supported by the NCT Node 110, the amount of traffic managed by the NCT Node 110 as a percentage of the maximum amount of traffic an NCT Node 110 should support, and the average speed of network access from an NCT Node 110. Based on these evaluations, the Node Manager 210 of an NCT Node 110 will decide whether to open up a new Channel 510 to a newly required NCT Node 110, or request that a new NCT Connection 410 be made through an already connected NCT Node 110 via pre-existing Channels 510. The NCT Node 110 then allocates traffic to existing NCT Connections 410, or new NCT Connections 410 are made based on the highest quality open Channel 510 available over the NCT Nodes 110 evaluated. In this manner, NCT as a whole, or only a specific portion of NCT, such as a few NCT Nodes 110, can be optimized without any specific NCT Node 110 needing to know the state of the entire network.

NCT Model

Referring back to FIG. 1, NCT Model 120 comprises a GIA-compliant model that describes NCT Components and the relationships among them. NCT Components are the GIA model constructs that represent all of the components that make up and create NCT. These components include, but are not limited to, NCT Machines 300, Network Appliances 230, NCT Nodes 110, NCT Controllers 130, NCT Parameters, NCT Capabilities, NCT Engines, and NCT Appliances, all either previously described or to be described in more detail below. NCT Model 120 is configured to describe to NCT Controller 130 how to manage NCT Nodes 110. In an embodiment of the invention, NCT Model 120 is described in a series of tables and stored in different SQL databases; one to be accessed by a GIA-compliant information architecture, and another to be accessed by the NCT Nodes 110. The constructs that define NCT Model 120 are configurations in GIA. Using combinations of configurations representing NCT Components, the NCT Model 120 describes and configures any set of network applications or network management appliances used to manage the network.

Figure 6:
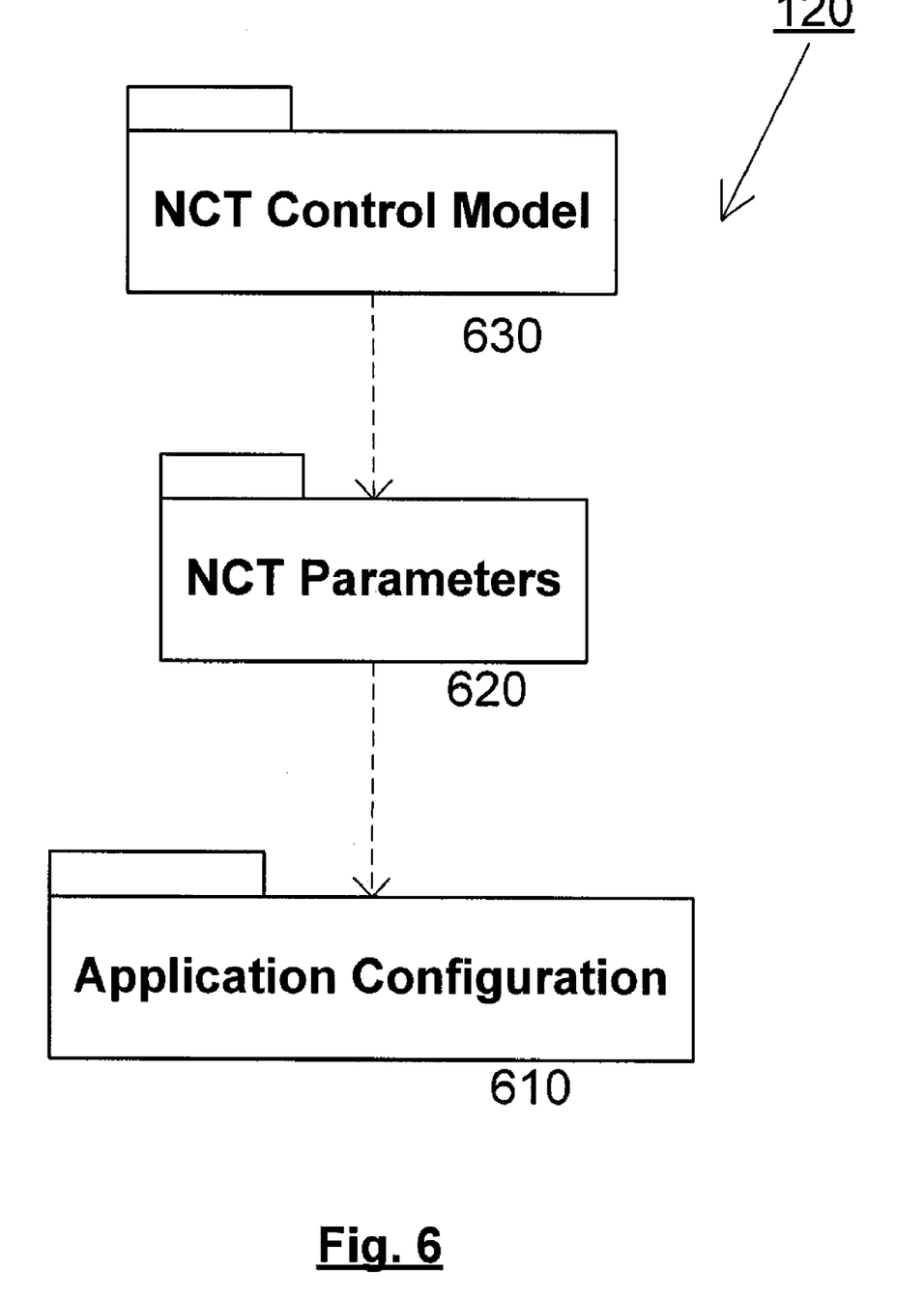
FIG. 6 illustrates an NCT Model according to an embodiment of the invention.

FIG. 6 illustrates an NCT Model 120 according to an embodiment of the invention. NCT Model 120 comprises an Application Configuration package 610, an NCT Parameters package 620, and an NCT Control Model package 630.

Figure 7:
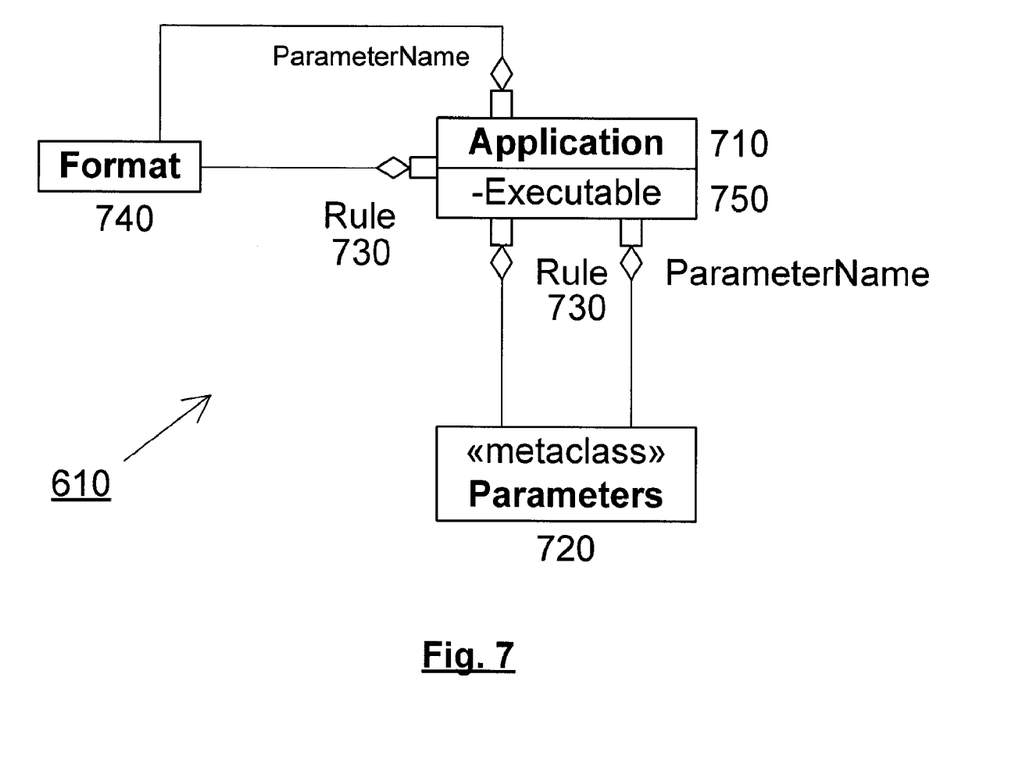
FIG. 7 illustrates an Application Configuration package according to an embodiment of the invention.

FIG. 7 illustrates an Application Configuration package 610 according to an embodiment of the invention. Application Configuration package 610 comprises the name of an application 710, which is the model construct related to an executable Network Application 340; parameters 720, which are referenced by name, and used by application 710; the parameters for any rules 730 the application 710 incorporates; the format 740 of rules 730; and the location and name of the actual executable 750 that runs application 710. Hence, the Application Configuration package 610 describes a GIA model that represents the parameter structure of an application 710. This parameter structure is used to configure an instance of application 710. This type of description capability, coupled with other constructs of the NCT Model 120, permits NCT to control virtually any type of parameterized application 710, of which Network Applications 340 are a subset. These applications can vary from a simple software application, such as RouteD, to a complete hardware based router, such as a Cisco 12000 Series high performance router.

Figure 8:
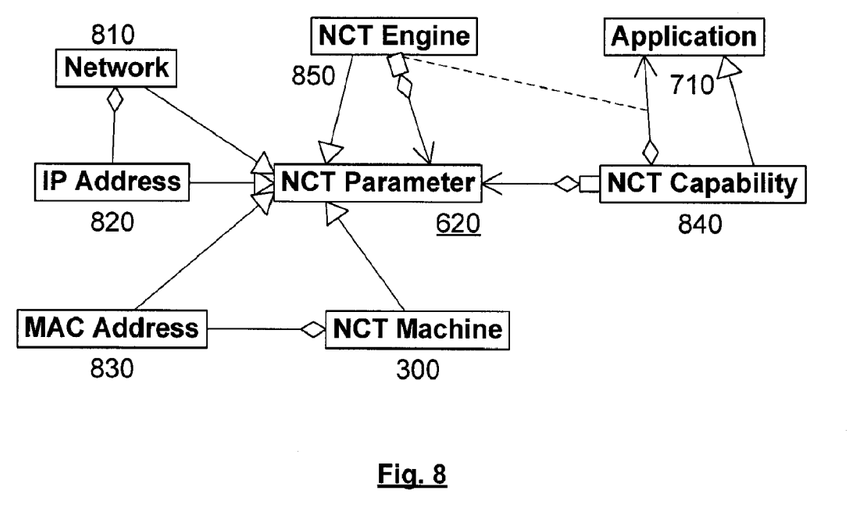
FIG. 8 illustrates an NCT Parameters package according to an embodiment of the invention.

FIG. 8 illustrates an NCT Parameters package 620 according to an embodiment of the invention. NCT Parameters package 620 comprises network parameters and specific NCT Components. NCT Parameters package 620 collects parameters used by application 710. Typical network parameters include Networks 810, IP Addresses 820 and MAC 830 addresses. NCT Components typically a part of the NCT Parameters package 620 include NCT Machine 300, NCT Capability 840, and NCT Engine 850. NCT Engine 850 is a collection of NCT Capabilities 840 from which instances of Appliance Managers 220 are configured, as described in FIG. 2 above. The named parameters associated with the NCT Engine 850 provide the parameter values that the NCT Capabilities 840 will use to configure application 710, as discussed above. Application 710 is configured to produce the desired behavior of the NCT Nodes 110 through the appropriate Network Applications 340. For example, an NCT Capability 840 could be "Static Routing," and the application 710 to be configured could be RouteD. The parameters needed by application 710 would thus be an IP Address and an Interface Card. The NCT Engine 850 would identify one of its parameters that would represent an incoming IP Address, and another of its parameters that would represent the outgoing interface card. These identified parameters are then used by NCT Capability 840 to configure application 710.

In an embodiment of the invention, the NCT Parameters package 620 is separated from Application Configuration package 610 to ensure that Application Configuration package 610 is as general as possible, thus permitting the Application Configuration package 610 to configure any application 710, regardless of whether the application 710 is related to NCT.

Figure 9:
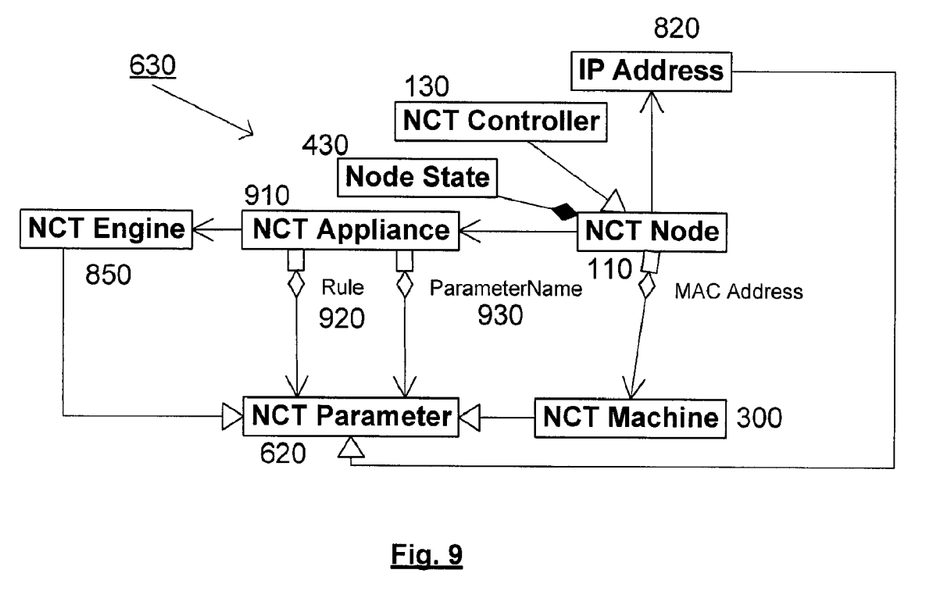
FIG. 9 illustrates an NCT Control Model package according to an embodiment of the invention.

FIG. 9 illustrates an NCT Control Model package 630 according to an embodiment of the invention. NCT Control Model package 630 comprises a model construct that represents an NCT Controller 130, an NCT Node 110, and an NCT Appliance 910. An NCT Appliance 910 comprises a model construct containing the configuration that will be used by the NCT Controller 130 to configure the Appliance Managers 220 in a particular NCT Node 110, as described in FIG. 2 above. In other words, an NCT Appliance 910 configuration will have values for all of the parameters and rules that are needed to configure its associated NCT Engine 850, and hence the Appliance Manager 220 that uses that configuration. NCT Appliance 910 identifies a collection of required values for each rule 920 and each ParameterName 930 to properly configure its NCT Engine 850, and thus the NCT Capabilities 840 encapsulated within it. NCT Node 110 executes NCT Appliance 910 on a particular group of NCT Machines 300 using Appliance Managers 220 running on one or more of the NCT Machines 300. NCT Node 110 also keeps track of its Node State 430, e.g. connected users, collective machine utilization, and bandwidth usage.

NCT Controller

Referring back to FIG. 1, NCT Controller 130 comprises an NCT Node 110 that controls and configures one or more other NCT Nodes 110. NCT Controller 130 uses the NCT Control Model package 630 it has been instructed to use by its BootConfiguration 320 to configure its Appliance Managers 220. The NCT Controller 130 does this by taking the model construct from the NCT Control Model package 630 and sending behavior definitions to the Appliance Managers 220, by way of the Node Manager 210, based on the information contained in the model construct. NCT Controllers 130 communicate with other NCT Controllers 130 to define an entire NCT controlled environment utilizing the NCT Node 110 communication methods previously discussed. Each NCT Controller 130 can manage any number of NCT Nodes 110, and can also provide instructions to other NCT Controllers 130 referenced in its model. Accordingly, any hierarchy of network control structures can be represented, with the definitions of the behavior of the network only having to be entered once. The collection of networks managed by an NCT Controller 130 is a cluster, with each NCT Node 110 in the cluster having a relationship with the other NCT Nodes 110 in the cluster. In an embodiment of the invention, the NCT Controller 130 is an instance of GIA that manages the NCT Model 120, and operates on a Windows Server functioning as a Webserver. A special information accessor (ContentServer) with references to NCT Nodes 110 is used to update the RCLI.

Figure 10:
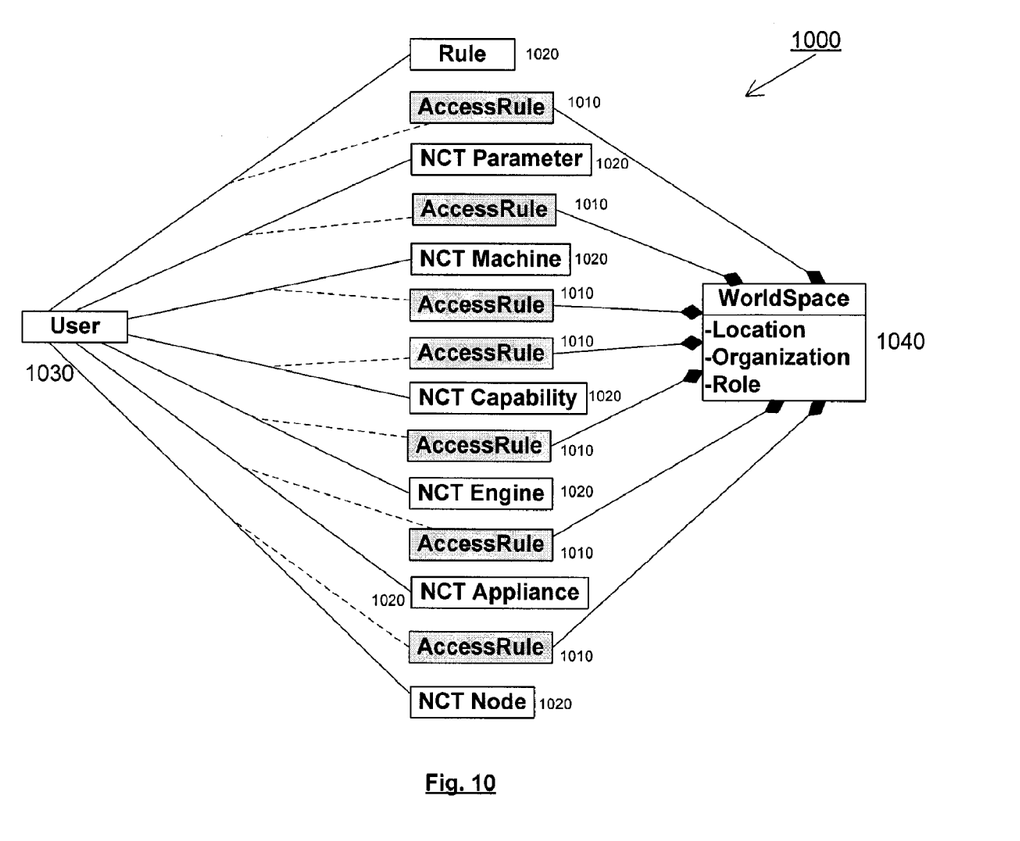
FIG. 10 illustrates a Global Information Architecture ("GIA") WorldSpace according to an embodiment of the invention.

FIG. 10 illustrates an NCT Configuration WorldSpace 1000 according to an embodiment of the invention. WorldSpace 1000 manages a network, which in turn makes up some, or all, of an NCT controlled environment. WorldSpace 1000 comprises Access Rules 1010, NCT Components 1020, a user 1030, and WorldSpace characteristics 1040. Access Rules 1010 are WorldSpace constraints-vectors described by VRDM which describe the relationship between user 1030 and NCT Components 1020. Access Rules 1010 determine the privileges of user 1030, and thus manage and control what user 1030 can and cannot do with NCT, such as which networks user 1030 has access to, what other users (not shown) with which s/he can communicate, and what Network Applications 340 user 1030 can configure. There is no limit to the number of NCT Components 1020 in WorldSpace 1000. User 1030 is anything that uses, administers, or interacts with NCT Components 1020 in any way. User 1030 can be, but is not limited to, a human, another program, or a device that interacts with NCT. Each user 1030 of NCT has a unique set of WorldSpace characteristics 1040 that drive the Access Rules 1010, and thus the configuration of the NCT Components 1020 for user 1030. WorldSpace characteristics 1040 can be role-based, geography-based, organizationally-based, or any combination thereof.

In an embodiment of the invention, NCT is implemented as a software-based environment with NCT Controllers 130 implemented in a version of GIA written for Microsoft's .NET environment that updates software-based routers through a C++ based RCLI. The software-based routers implement routing applications, including, but not limited to, DNS, DHCP, routing, firewall, and redundancy.

A further embodiment of the invention is program instructions on one or more computer readable mediums to carry out the invention. A computer readable medium is any data storage device that is capable of storing data, or capable of permitting stored data to be read by a computer system. Examples include hard disk drives (HDDs), flash memory cards, such as CF cards, SD cards, MS cards, and xD cards, network attached storage (NAS), read-only memory (ROM), random-access memory (RAM), CD-ROMs, CD-Rs, CD-RWs, DVDs, DVD-Rs, DVD-RWs, holographic storage mediums, magnetic tapes and other optical and non-optical data storage devices. The computer readable medium can also be in distributed fashion over multiple computer systems or devices which are coupled or otherwise networked together and capable of presenting a single view to a user of the medium.

Other embodiments and uses of the invention will be apparent to those skilled in the art from consideration of the specification and practice of the invention disclosed herein. It will be understood by those skilled in the art that various changes in form and details may be made therein without departing from the spirit and scope of the invention as defined in the appended claims.

The invention claimed is:

1. A method for managing a set of network-support devices on a network in a controlled environment with a device, the method comprising the steps of:
    defining an application model for each network-support device, the application model including a parameter structure, a parameter configuration having a parameter for the controlled environment, and a command structure;
    describing a model of the network and its characteristics;
    describing a parameter model that translates the network and its characteristics into the application model for each network-support device;
    configuring the device with the network, parameter, and application models for each network-support device;
    receiving a description of desired network behavior from a network control system;
    translating said network behavior description into a configuration for each network-support device through the parameter and application models; and
    transmitting said configuration to its respective network-support device.

2. The method of claim 1, wherein defining said application model further comprises
    defining a parameter structure, wherein said parameter structure comprises a parameter for an application and a first information object;
    defining a parameter configuration, wherein said parameter configuration comprises a parameter for a controlled environment and a second information object; and
    defining a command structure, wherein said command structure comprises a template with said parameter structure.

3. The method of claim 2, wherein said parameter structure includes a parameter specifying a location of an executable to run said application.

4. The method of claim 1, wherein said receiving comprises the steps of:
    polling a specified location for an updated description of network behavior; and
    receiving from said specified location an updated description of network behavior.

5. The method of claim 4, wherein said specified location has no access to the system receiving said network behavior definition.

6. The method of claim 1, wherein said description of network behavior is received at a secure location accessible by the device.

7. The method of claim 1, wherein said configuration is transmitted using a secure transmission scheme.

8. The method of claim 1, wherein the network support devices are not homogeneous.

9. The method of claim 1 wherein the device that manages the network-support devices comprises a network-support device.

10. A computer readable medium storing computer-executable instructions for performing a method comprising:
    defining an application model for each network-support device, the application model including a parameter structure, a parameter configuration having a parameter for the controlled environment, and a command structure;
    describing a model of the network and its characteristics;
    describing a parameter model that translates the network and its characteristics into the application model for each network-support device;
    configuring the device with the network, parameter, and application models for each network-support device;
    receiving a description of desired network behavior definition from a network control system;
    translating said network behavior description into a configuration for each network-support device through the parameter and application models; and
    transmitting said configuration to its respective network-support device.

* * * * *